US008354850B2

(12) United States Patent
Soerensen et al.

(10) Patent No.: US 8,354,850 B2
(45) Date of Patent: Jan. 15, 2013

(54) METHODS AND SYSTEMS FOR DETECTING THE PRESENCE, OR DETERMINING THE LOCATION OR THE SIZE, OR DETECTING CHANGES OF MATERIAL PROPERTIES, OF AN OBJECT WITHIN A PREDEFINED SPACE

(75) Inventors: Joern Soerensen, Aabyhoej (DK); Henrik Riehm Soerensen, Silkeborg (DK)

(73) Assignee: Shelltec A/S, Aabyhoej (DK)

( * ) Notice: Subject to any disclaimer, the term of this patent is extended or adjusted under 35 U.S.C. 154(b) by 369 days.

(21) Appl. No.: 12/669,359

(22) PCT Filed: Jul. 16, 2008

(86) PCT No.: PCT/DK2008/000269
§ 371 (c)(1),
(2), (4) Date: Jul. 15, 2010

(87) PCT Pub. No.: WO2009/010064
PCT Pub. Date: Jan. 22, 2009

(65) Prior Publication Data
US 2010/0271047 A1   Oct. 28, 2010

(30) Foreign Application Priority Data
Jul. 17, 2007   (DK) .................. 2007 01058

(51) Int. Cl.
*G01R 27/26* (2006.01)
*G08B 13/26* (2006.01)

(52) U.S. Cl. ......... 324/658; 324/684; 324/686; 340/562

(58) Field of Classification Search .................. 324/658, 324/649, 600, 686, 663, 672, 679, 684; 340/540, 340/541, 561, 562, 545.4
See application file for complete search history.

(56) References Cited

U.S. PATENT DOCUMENTS

| 5,012,237    | A  | * | 4/1991 | Rosswurm ............... 340/870.37 |
| 5,942,975    | A  | * | 8/1999 | Sørensen ....................... 340/562 |
| 2006/0086995 | A1 | * | 4/2006 | Lasalandra et al. ........... 257/415 |
| 2010/0107391 | A1 | * | 5/2010 | Lasalandra et al. .......... 29/25.41 |

FOREIGN PATENT DOCUMENTS

EP   0 850 385 B1   9/1996

* cited by examiner

*Primary Examiner* — Hoai-An D Nguyen
(74) *Attorney, Agent, or Firm* — McCormick, Paulding & Huber LLP (57) ABSTRACT

A method for detecting the presence, and/or determining the location, and/or detecting changes in the material properties, of a first object (4) within a predefined space (12) and compensating for the disturbance caused by a second object, where the method comprises the following steps: providing at least a first and a second electrode (6) capacitively coupled to each other; conductively applying an electrical signal to each of the first and second electrodes (6), the electrical signals being different for the first and second electrodes (6); for each of the electrodes (6) measuring the current signal through, and/or the voltage signal on, the electrode (6); deriving from the measured values an indication of the disturbance caused by the second object; and deriving from the measured values and the indication of the disturbance a disturbance-compensated indication of the presence, and/or the location, and/or changes in the material properties, of the first object (4).

15 Claims, 9 Drawing Sheets

METHODS AND SYSTEMS FOR DETECTING THE PRESENCE, OR DETERMINING THE LOCATION OR THE SIZE, OR DETECTING CHANGES OF MATERIAL PROPERTIES, OF AN OBJECT WITHIN A PREDEFINED SPACE

CROSS REFERENCE TO RELATED APPLICATIONS

This application is entitled to the benefit of and incorporates by reference essential subject matter disclosed in International Patent Application No. PCT/DK2008/000269 filed on Jul. 16, 2008 and Danish Patent Application No. PA 2007 01058 filed Jul. 17, 2007.

BACKGROUND OF THE INVENTION

The invention relates to systems and methods for detecting the presence, or determining the location or the size, of an object in specific zones or areas. Such systems are typically used to restrict personnel access to specific areas of a building, to stop or deactivate dangerous machines when workers approach them, or to locate and count objects on a conveyor belt. It also relates to systems for detecting changes in the conductivity, e.g. due to changes in the dielectric constant, of an object. Such systems can be used to e.g. detect changes in the humidity or viscosity of a medium or objects within a predefined space.

A known class of detector systems typically use a combination of light emitting sources and light sensing devices, where a light beam between a source and a sensor is interrupted by the object to be detected when it crosses the line of sight between the source and the sensor. Such systems have several limitations, especially when used in harsh environments. First, the object has to pass through a specific line, or a limited number of lines, in space in order to be detected. Depending on the application, this requirement may lead to objects not being detected by the system. Furthermore, both light sources and light sensors may be subjected to dirt, moisture, mechanical damage or chemicals, which may alter or obscure the light path whereby the object-detecting capability of the system decreases or ceases completely. Mechanical forces, e.g. from a water spray, acting on the detector system during cleaning or rinsing of the system or its surroundings, may change the alignment of source and sensor with similarly negative effects. In a typical large slaughterhouse, for instance, there may be several thousand of such optical detector systems installed for detecting, locating and counting meat cuts on various forms of conveying and/or processing apparatus, e.g. conveyor belts or conveyor rails. The apparatus must be kept clean at all times in order to avoid contamination of the meat, wherefore the apparatus, and consequently the detector systems, are frequently rinsed with hot water or steam under high pressure. The temperature changes induced thereby put a stress on the light windows of detector systems, which causes them to deteriorate or crack, which again may cause the detector systems to fail. Consequently, a large installation in a slaughterhouse requires a large amount of maintenance and repair work, which again raises the cost of running the facility. Also possible stand-stills of machinery due to defective detector systems can be very expensive, especially since meat cuts may be declassified and hence lose value due to stand-stills.

Another class of known object sensing systems reacts to changes in the capacitance between two electrodes—or between a single electrode and ground—or between a single electrode and circuit ground, the change being induced by an object moving into the zone between the electrodes or between the electrode and ground/circuit ground. The presence of the object is detected by comparing the measured capacitance to a predetermined threshold. Since electrodes can be made of stainless steel or other metallic materials, which can easily withstand the harsh environment in e.g. a slaughterhouse, it would be desirable to use this kind of detector system instead of the more fragile optical systems described above. Furthermore, such systems can easily detect a change of the conductivity of a non-moving object in the zone or area. However, a typical limitation with this kind of system is that persons or moving objects in the vicinity, which are not meant to be detected by the system, may alter the capacitance and thus either cause false alarms or mask capacitance changes caused by objects that should be detected or measured, thereby causing the system to fail. This is especially true in an environment where workers perform their work close to the conveyor belts where the detector systems are in use. Furthermore, the known systems are not precise enough to detect each of a series of objects on e.g. a conveyor belt, when these objects are close to each other. The precision of known systems is typically related to their detection range, so that systems working within a range of a few centimeters may be very precise, whereas systems with larger detection ranges are less precise. In order to enable a practical detection and/or measurement of objects like meat cuts on a conveyor belt, the detection/measurement range should be at least one half meter, preferably more, and at the same time a precision of only a few centimeters or less is desired.

The output of the detector system on a conveyor belt is typically used to detect the precise location of e.g. meat cuts, so that dedicated machines may perform controlled actions with the objects, such as grasping the objects or attaching labels to them. It would therefore be desirable to have a detector system, which can determine the exact location of the detected objects. The European Patent EP 0 850 385 discloses a method for determining the distance between two objects, which are coupled capacitively to each other, by inducing an electrical voltage signal to one of the objects and measuring the signal level on the other object. The therein disclosed method could be used to enable the detector system to determine the location of the objects, but it suffers partly from the same limitations as the capacitance based systems described above. It furthermore depends on the possibility of inducing a well known voltage level to, or measuring a level accurately on, one of the objects, which is typically difficult to obtain, especially when the objects on a conveyor belt are of at least slightly different sizes, like meat cuts typically are.

SUMMARY OF THE INVENTION

It is an objective of the present invention to overcome the above mentioned limitations of the known systems for capacitively detecting the presence, and/or determining the location, of an object within a predefined space, so that such systems can be used instead of optical detector systems. It is a further objective of the invention to improve the known systems for capacitively detecting changes in the material properties. This is accomplished in a first aspect of the invention by providing a method for detecting the presence, and/or determining the location, and/or detecting changes in the material properties, of a first object within a predefined space and compensating for the disturbance caused by a second object, where the method comprises the following steps: providing at least a first and a second electrode capacitively coupled to each other; conductively applying an electrical signal to each of the first and second electrodes, the electrical signals being different for the first and second electrodes; for each of the electrodes measuring the current signal through, and/or the voltage signal on, the electrode; deriving from the measured values an indication of the disturbance caused by the second object; and deriving from the measured values and the indication of the disturbance a disturbance-compensated indication of the presence, and/or the location, and/or changes in the material properties, of the first object. By applying different signals to at least two electrodes, not only can the effects of an object coupling asymmetrically to the electrodes easily be distinguished from the effects of an object coupling symmetrically to the electrodes, but it can also be determined, which electrode is closest to an asymmetrically coupling object. This can be used to distinguish the desired capacitance changes due to objects meant to be detected from capacitance changes due to disturbing objects. This applies, for instance, if the objects meant to be detected approach the detector system substantially along a plane equidistant from the electrodes whereas the disturbing objects approach the system or move outside the plane.

In a further aspect of the invention, the method may be further improved in order to enhance the precision of the determination of the location of an object. This is accomplished by adding the steps of: processing the measured values, and/or the disturbance-compensated indication of the presence, and/or the location, of the first object, in the time domain; and deriving from the processed data an improved indication of the location of the first object. If the object approaches the detector system with substantially constant speed and along a linear path, identifying temporal extremes of the processed data will yield more precise location data than the single measurements. Furthermore, the temporal variations of the processed data will indicate whether an object approaches (or leaves) the detector system substantially along a line perpendicular to a line connecting the electrodes or along a line with another angle to the connecting line. If the size of the object is known, temporal processing further enables determination of the object's speed, and vice versa.

In still further aspects of the invention, the method may be improved by controlling the signals applied to each of the first and second electrodes so that the signals differ in phase, and/or frequency, and or in the time domain, thereby facilitating the distinguishing between proximity of an object to the first or the second electrode.

In a further aspect, a system may be provided for detecting the presence, and/or determining the location, and/or detecting changes in the material properties, of a first object within a predefined space and compensating for the disturbance caused by a second object, the system comprising at least a first and a second electrode capacitively coupled to each other, at least one signal generating circuit conductively coupled to each of the first and second electrodes, at least one current and/or voltage sensing circuit coupled to each of the electrodes, and a detector circuit connected to the sensing circuits, the system further implementing the methods described above.

In a further aspect, the first electrode and/or second electrode may be shielded on their outsides, i.e. the sides opposite the predefined space, by one or more electrically conductive shields. The shields reduce the capacitance between the electrodes and objects outside the predefined space, which will therefore affect the measured values less.

In a further aspect, one or more of the shields may be connected to ground and/or circuit ground. Thereby the capacitive influence from the shield on the shielded electrode will become constant and therefore easier to compensate for.

In a further aspect, at least one of the shields may be connected to a signal source outputting a signal equal to the signal on the electrode shielded by this shield. Thereby the capacitive influence from this shield on its shielded electrode will become negligible. This is an improvement with respect to the grounded-shield system, where the current flow through an electrode will change significantly when a person touches a shield, due to the fact that the person thereby increases the capacitance between ground/circuit ground and the sensor electrode.

In a further aspect, one or more of the shields may be connected to a signal source outputting a signal equal to the signal on an electrode not being the electrode shielded by the shield. In a system with two shielded electrodes, this will remove the capacitive influence between each electrode and its opposite shield and thereby increase the sensitivity of the system to capacitance changes taking place in the space between the electrodes.

In a further aspect, the system may comprise at least one buffer amplifier with high input impedance, the input of the buffer amplifier being connected to one of the electrodes and its output being connected to at least one of the shields. In this way, a voltage signal equal to, or otherwise depending on, the voltage signal on an electrode can be applied to a shield without changing the current flowing to or from the electrode.

In a further aspect, the at least one signal generating circuit may comprise a signal generator with a first and a second output, the first output being connected through a first non-zero series impedance to the first electrode and the second output being connected through a second non-zero series impedance to the second electrode, the signals output by the first and second outputs having reversed polarity with respect to each other. In case the signals are sine wave signals, this corresponds to a phase shift of ±180°. This is a simple way to apply different voltage signals to the electrodes, which also allows for easy sensing of electrode voltages and currents.

In a still further aspect, the system may comprise at least four buffer amplifiers with high input impedance, a first electrically conductive shield arranged on the outside of the first electrode and a second electrically conductive shield arranged on the outside of the second electrode, the input of the first buffer amplifier being connected to the first electrode and its output being connected to the second shield, the input of the second buffer amplifier being connected to the second electrode and its output being connected to the first shield, the input of the third buffer amplifier being connected to the first shield and its output being connected through a third non-zero series impedance to the second electrode and the input of the fourth buffer amplifier being connected to the second shield and its output being connected through a fourth non-zero series impedance to the first electrode, the sizes of the series impedances and the gains of the buffer amplifiers being selected so that the currents flowing between the first electrode and the first shield as well as between the second electrode and the second shield due to capacitive coupling are substantially supplied—and thus compensated for—by the third and fourth buffer amplifier respectively. In this system, the current flowing to or from the electrodes through the first and second non-zero series impedances will substantially equal the current flowing between the first and the second electrode due to capacitive coupling between the electrodes. Any changes in the capacitance between the first and second electrodes will therefore be reflected directly in a change of the current flowing through the first and second non-zero series impedances.

In a further aspect of the invention, a method may be provided for measuring impedances in the detector system, the method comprising the steps of: disconnecting at least one electrode and/or shield from ground and/or circuit ground and/or its corresponding signal sources; applying a voltage signal to at least one other electrode and/or shield; measuring the current through, and/or the voltage on, at least one electrode and/or shield. By disconnecting one or more electrodes or shields from other system parts, either physically or via electronic switches, the currents flowing to or from the respective components are eliminated, whereby the influence of the components on signals in other parts of the system is reduced. Hence, it is possible to measure impedances or capacitances between other system parts more accurately.

In a further aspect, the method may be improved by adding the steps of: adjusting the applied signals and/or the non-zero series impedances in the system on the basis of the measured impedance values. The adjustment procedure may be performed manually or automatically, once after system installation or repeatedly, whereby the system can be calibrated or adjusted to meet specific requirements. By repeating the adjustment procedure, the system can automatically adapt to changes in the environment or within the system.

In a further aspect, a method may be provided for adjusting the system, the method comprising the steps of: providing a voltage sensing probe; moving the probe within the predefined space; identifying positions with minimum signal level; adjusting the applied signals and/or the non-zero series impedances in the system on the basis of the identified positions. Using a probe to e.g. detect a zero-voltage location between two electrodes driven with signals of reversed polarity, provides a simple means of checking the adjustment of the individual signal levels.

BRIEF DESCRIPTION OF THE DRAWINGS

In the following, the invention will be described with reference to the drawings, where.

DETAILED DESCRIPTION OF THE PREFERRED EMBODIMENTS

Figure 1:
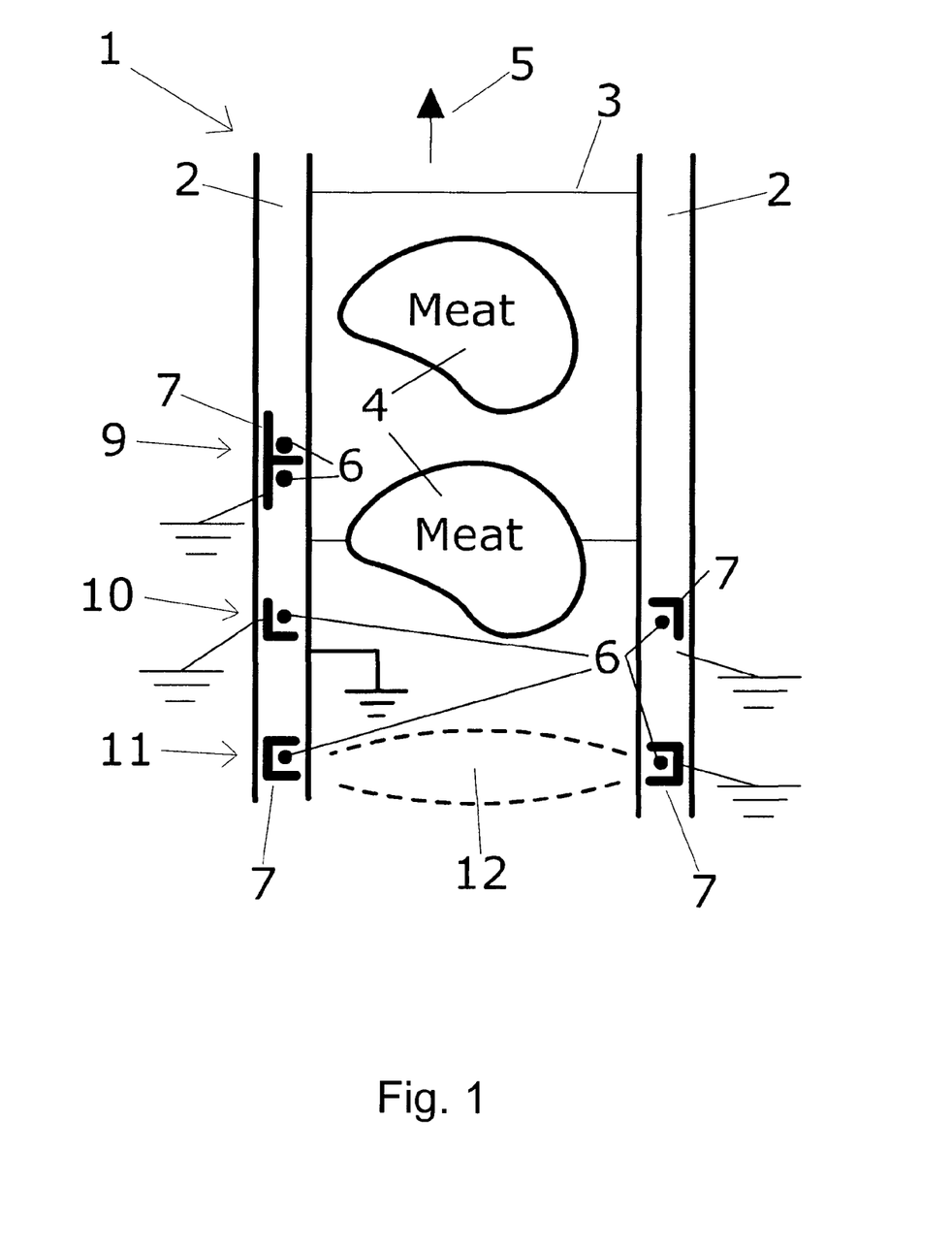
FIG. 1 shows a top-down view on three examples of applications of a system according to the invention.

The conveying system 1 shown in FIG. 1 comprises a frame 2 and a conveyor belt 3. The conveyor belt 3 moves a number of meat cuts 4 in the direction indicated by the arrow 5. On the frame 2 are arranged a number of electrodes 6 and shields 7. The frame 2 and the shields 7 are connected to ground potential. The electrodes 6 and shields 7 form part of detector systems 8 (not shown) according to the invention. In the drawing, the three pairs 9, 10, 11 of electrodes 6 are shown as belonging to individual detector systems 8, but may alternatively belong to a single system 8. Due to the inventive properties of the systems 8 in combination with the dielectric properties of the air, or any other suitable medium, such as gas, water, viscous liquids or granular materials, surrounding the electrodes 6 and the shields 7, predefined spaces 12, or sense regions, are formed, within which the systems 8 are especially sensitive to changes of the dielectric properties. The systems 8 are therefore able to detect objects 4 in the sense region 12, provided the objects 4 possess different dielectric properties than the surrounding medium. Furthermore, due to further aspects of the invention, which will be described below, the systems 8 are able to distinguish such objects 4 from other moving objects outside the sense region 12. The drawing also shows three different examples of usable shield 7 cross sections.

Figure 2:
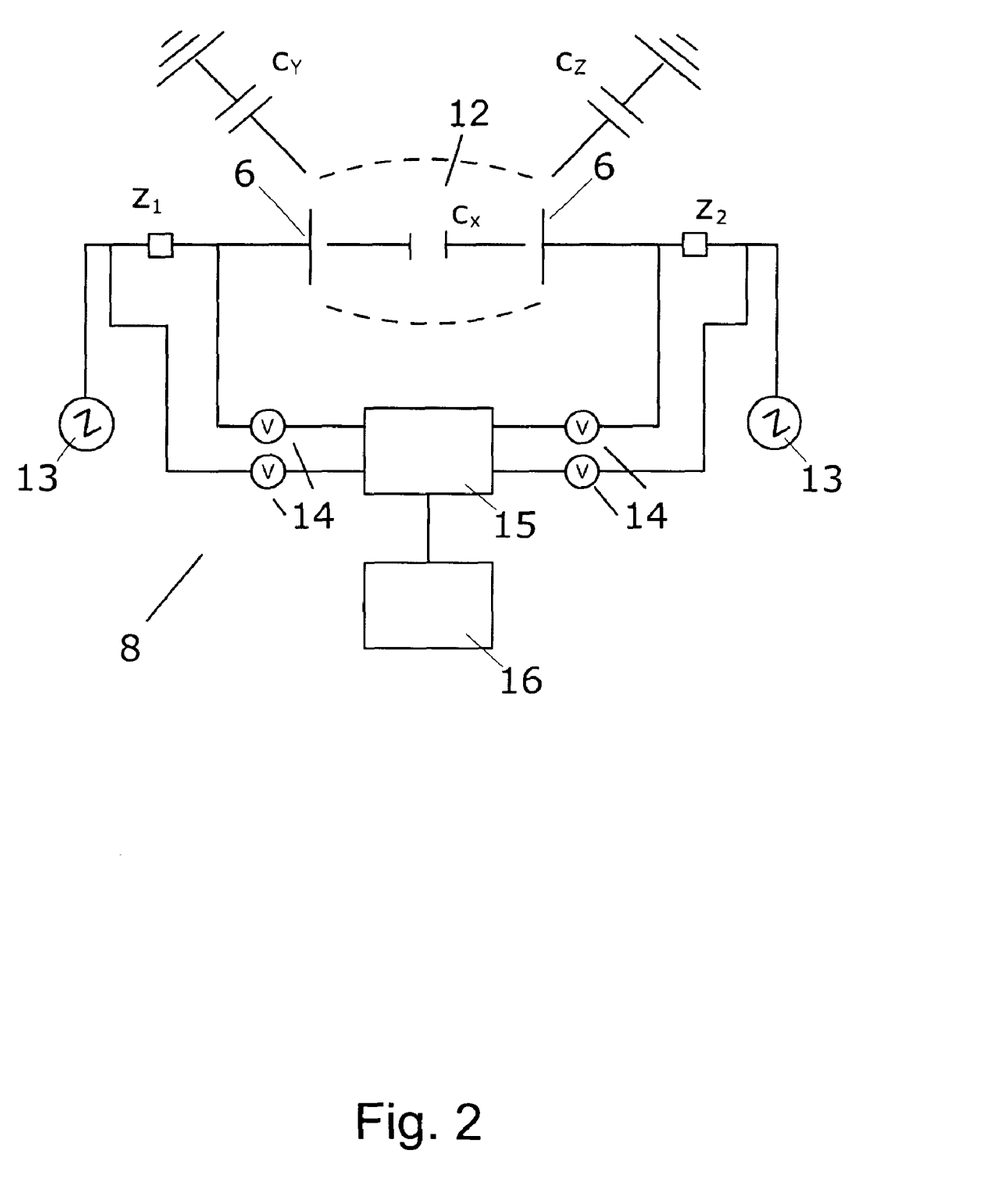
FIG. 2 shows a schematic of a first embodiment of a system according to the invention.

The detector system 8 shown in FIG. 2 comprises two electrodes 6, which are capacitively coupled to each other through the air between the electrodes 6. The coupling may be characterized by the capacitance $C_X$. The electrodes 6 also couple capacitively to the ground. The coupling to ground may be characterized by the capacitances $C_Y$ and $C_Z$ respectively. Each electrode 6 is connected conductively through a non-zero series impedance Z1, Z2 to its own signal generating source 13. The term conductively means by means of a conductive lead or by means of one or more electronic components, such as resistors, inductors, capacitors, semiconductors etc. The purpose of using this term is to distinguish such coupling from a capacitive coupling, which might be affected by the objects to be detected or measured, as would be the case if the coupling between the signal generating source 13 and the electrode 6 took place e.g. through the ambient air. Voltmeters 14 are connected to both sides of the series impedances Z1, Z2, whereby both the voltage signal and the current flowing to or from the electrodes 6 can be measured. The outputs of the voltmeters 14 are led to a detector circuit 15, the output of which is connected to a control system 16, which controls e.g. a factory production line (not shown).

The signal generating sources 13 generate oscillating signals, i.e. AC signals, since AC signals may be carried as electrical fields through the air and due to capacitive coupling be transferred from one electrode 6 to another electrode 6. The AC signals are not restricted to specific waveforms, amplitudes or frequencies and may be varied over time. By applying different signals to the two electrodes 6 through non-zero series impedances Z1, Z2, it is ensured that changes in the capacitance $C_X$ between the electrodes 6 will affect the voltage signals on, and/or the currents flowing to or from, the electrodes 6. The currents can be measured by measuring the voltage drops across the series impedances Z1, Z2. The capacitance $C_X$ depends on the distance between the electrodes 6, on the shape and size of the electrodes 6 and on the conductivity of the material between the electrodes 6. Each material may be characterized by a certain material constant that specifies its conductivity, i.e. the dielectric constant, which is often defined in relative terms, i.e. relative to the dielectric constant of vacuum. The system 8 can be optimized to sense changes, e.g. objects 4 being moved into, or removed from the sense region 12 by proper sizing of the series impedances Z1, Z2. For maximum sensitivity to changes in $C_X$, the magnitudes of the two series impedances Z1, Z2 are preferably chosen to be equal and close to the capacitance $C_X$ in an equilibrium or steady state of the sense region 12. The series impedances Z1, Z2 may comprise both resistive, non-frequency-dependent, parts and reactive, i.e. frequency-dependent, parts such as capacitances or inductances. In the remaining part of this description it is for simplicity assumed that the series impedances Z1, Z2 are purely resistive.

Any conductive object approaching the detector system 8 will cause an increase of the capacitances $C_X$, $C_Y$ due to the coupling between the object and the ground on one hand and the coupling between the object and the electrodes 6 on the other hand. If the electrodes 6 are arranged on opposite sides of e.g. a conveyor belt 3, objects 4 on the conveyor belt 3 will typically cause a rather symmetrical increase, since the distances between the object 4 and the individual electrodes 6 are comparable. A disturbing object, such as a human, approaching the detector system 8 from the side of the conveyor belt 3 will, however, cause a highly asymmetric increase due to the larger differences in its distances to the electrodes 6. The detector 15 continuously computes the capacitances $C_X$, $C_Y$ and $C_Z$ from the measured voltages received from the voltmeters 14. If the detector 15 detects an asymmetric increase in the capacitances $C_Y$, $C_Z$, it computes a corresponding estimated disturbance of the capacitance $C_X$ and reduces the computed value of $C_X$ by the estimated disturbance in order to compensate for the effects of an assumed disturbing object, thereby maintaining the system 8 in a state wherein objects 4 on the conveyor belt 3 can still be reliably detected. The detector 15 may perform its computation by means of analog electronic circuits, digital circuits, software or a combination hereof. If the detector system 8 is equipped with more than two electrodes 6, the detector computes the corresponding additional capacitances as well and in a similar way; an increased number of electrodes 6, and hence an increased number of measurement values, may contribute substantially to improving the accuracy of the estimation of the disturbance from a disturbing object.

The signals applied to the individual electrodes 6 may differ in amplitude, phase or frequency. Alternatively or additionally, frequency sweeps or short signals pulses may be applied at different times to the individual electrodes 6. These methods may be used to facilitate the distinction between currents induced by voltage signals from different electrodes 6. For instance, if a signal with a first frequency is applied to one electrode 6 and a signal with a second, different frequency is applied to an other electrode 6, two simple frequency filters followed by two level detectors may be used to determine, which electrode is closest to an object.

The signal frequencies are preferably chosen from the range 1 kHz to 3 MHz, more preferably from the range 10 kHz to 500 kHz, even more preferably from the range 50 kHz to 200 kHz and most preferably from the range 100 kHz to 150 kHz. These frequencies yield the highest sensitivities and may still be handled with inexpensive electronic circuits.

The signal levels are preferably chosen to be sufficiently high to enable detection, but low enough not to endanger any persons nor cause damage to materials. A preferred voltage range is 10 mV to 10 V, more preferably 100 mV to 3 V, and most preferably 1 V to 3V.

Figure 3:
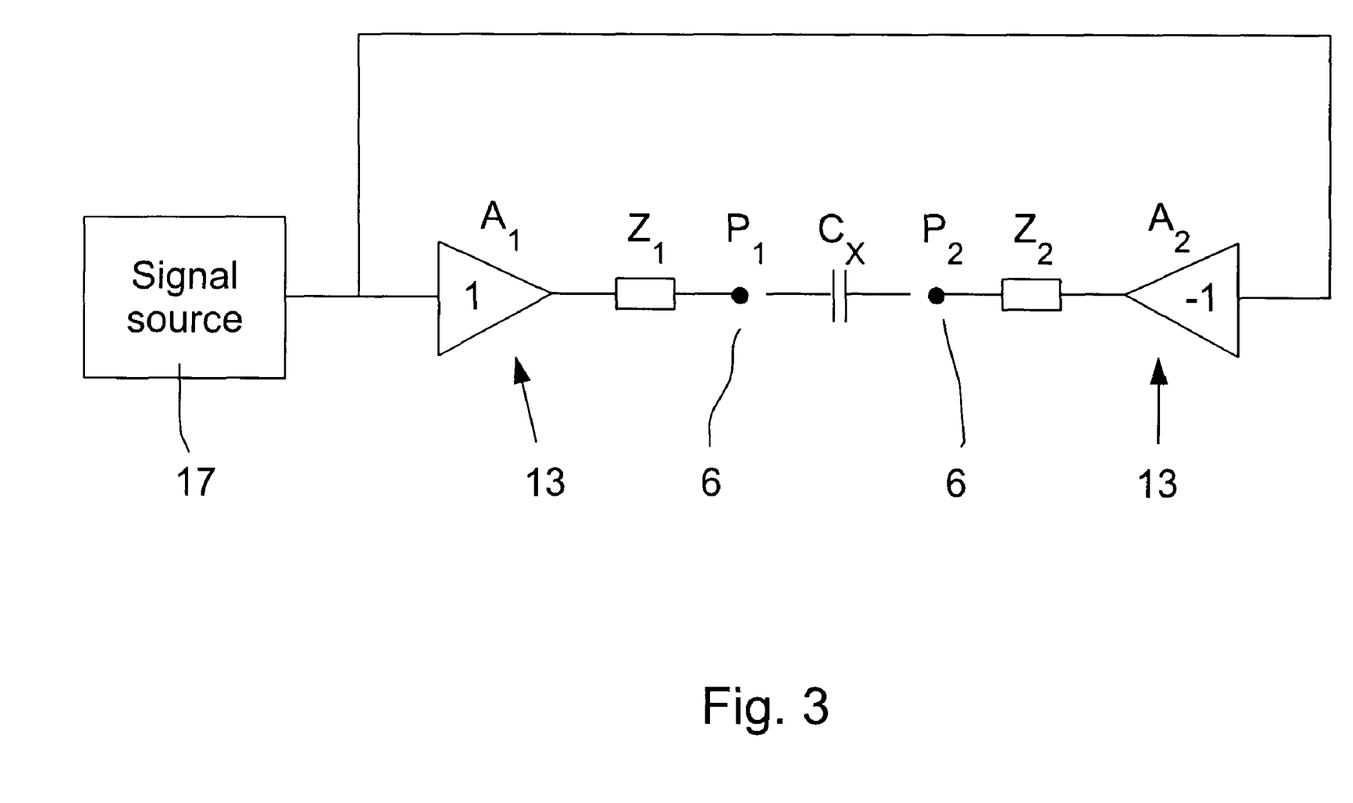
FIGS. 3-5 show schematics of parts of further embodiments of a system according to the invention.

FIG. 3 shows a preferred embodiment of the signal generating part 13 of the detector system 8. A common signal source 17 is connected to a first electrode 6 through a first buffer amplifier A1 with high-impedance input and unity gain and a first non-zero series impedance Z1. The signal source 17 is further connected to a second electrode 6 through a second buffer amplifier A2 with high-impedance input and reversed unity gain and a second non-zero series impedance Z2. Preferably, the series impedances Z1, Z2 are equal. The signals applied to the electrodes are thus equal in amplitude, but have reversed polarity relative to each other. The current flowing through $C_X$ will affect the voltage signals P1, P2 on the first and second electrodes 6. By observing the amplitudes and phases of the voltage signals P1, P2, or the difference between the voltage signals P1, P2, $C_X$, and/or changes hereof, can be calculated. In one extreme case, the voltage signals P1, P2 will be equal to the respective driving signals, i.e. the outputs of the buffer amplifiers A1, A2. This is the case when $C_X$ is zero (infinite reactance). In the other extreme case, i.e. when $C_X$ is infinite (zero reactance) the voltage signals P1, P2 will be identical. In most normally encountered cases, at least one position exists between the two electrodes 6, where the electrical potential is zero. This position represents a virtual ground potential for the sensor system 8 and may be used for calibration or adjustment of various parts of the system 8. This may be accomplished by moving a voltage sensing probe within the predefined space, thereby identifying positions with minimum signal level—or zero signal level. One or more of the applied signals, amplifier gains and/or non-zero series impedances Z1, Z2 (Z5, Z6 in FIGS. 4 and 5) in the system 8 may subsequently be adjusted, e.g. with the goal to move the zero-level position into the middle of the sensing region 12.

Figure 4:
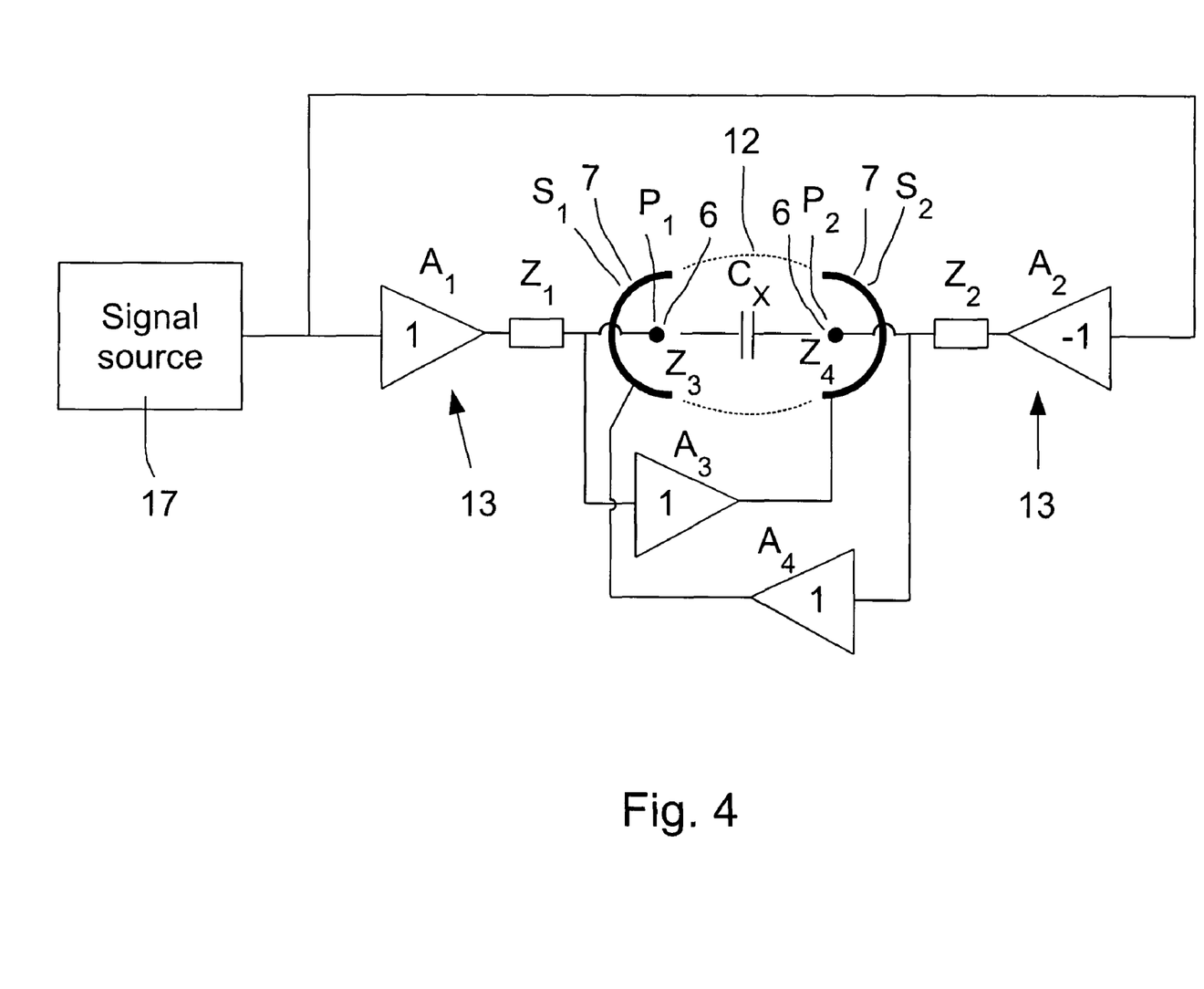

FIG. 4 shows a further improved, preferred embodiment of part of the detector system 8 shown in FIG. 3, where a shield 7 is arranged on the outside of each electrode 6, where the first shield 7 is located close to the first electrode 6 and the second shield 7 is located close to the second electrode 6. A third buffer amplifier A3 with high-impedance input, unity gain and low-impedance output has its input connected to the first electrode 6 and its output to the second shield 7. A fourth buffer amplifier A4 with high-impedance input, unity gain and low-impedance output has its input connected to the second electrode 6 and its output to the first shield 7. The signals applied to each shield 7 are thus buffered replica of the signals present on the electrodes 6 on the opposite side of the sense region 12. The signals on the shields 7 are therefore of the same amplitude and phase as the oppositely placed electrodes 6, so that no current will flow between an electrode 6 and its opposite shield 7. The capacitance between the two shields 7 has no influence on the system 8, since both shields 7 are driven by low-impedance amplifier outputs. The resulting detector system 8 is highly immune to situations where e.g. a person placed behind, i.e. on the outside of, one of the shields 7 gets close to, or even touches, the shield 7, but the system 8 is still very sensitive to capacitance changes within the sense region 12. The coupling between the first electrode 6 and the first shield is represented by the impedance Z3. The coupling between the second electrode 6 and the second shield is represented by the impedance Z4. The currents flowing between the electrode 6 and their local shields 7 through the impedances Z3, Z4 may easily be compensated for in the detector 15, since the impedances Z3, Z4 are determined substantially by the shapes, and the relative arrangement, of the respective electrodes 6 and shields 7, and therefore are both well known and substantially constant.

Figure 5:
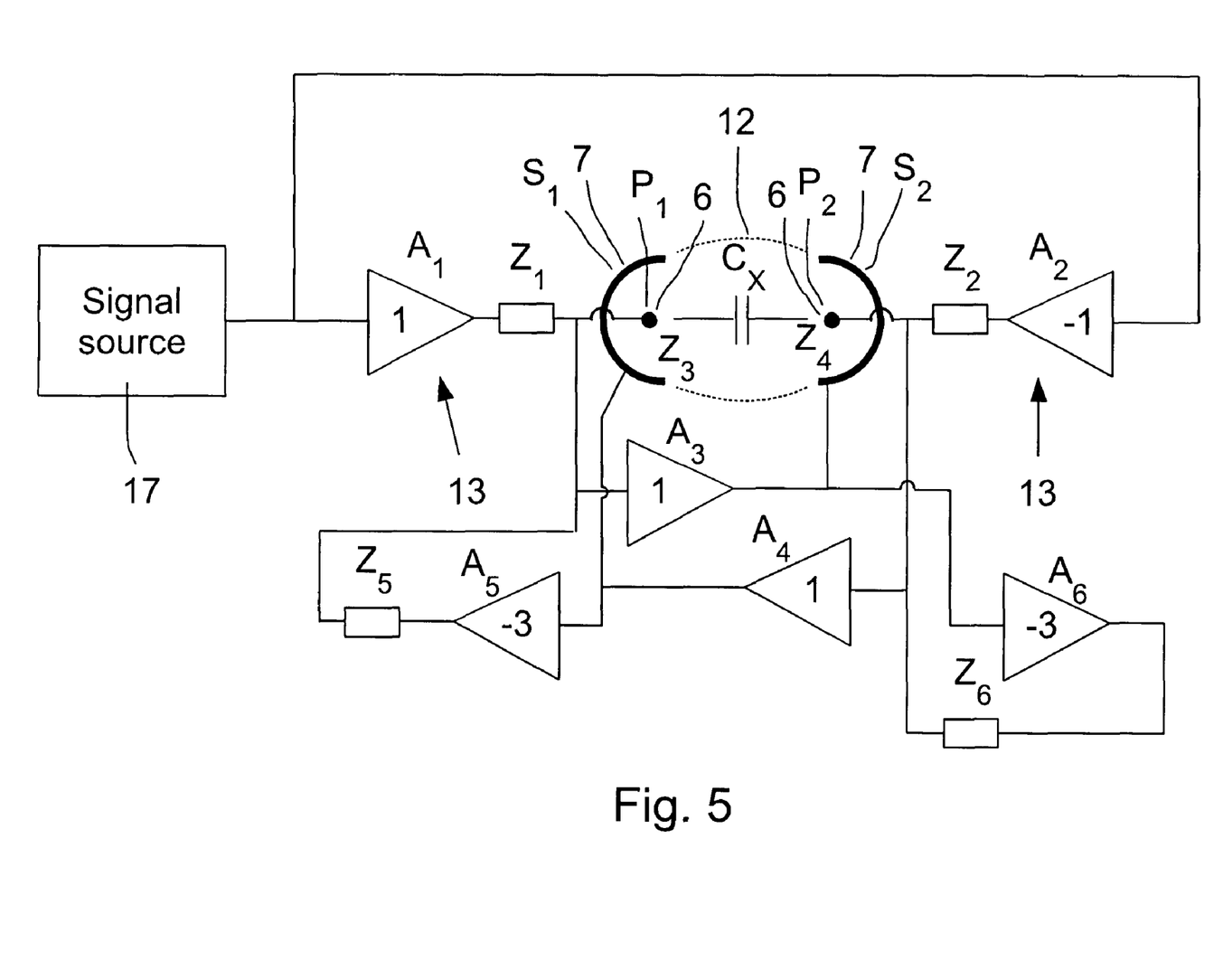

FIG. 5 shows a further improved, preferred embodiment of part of the detector system 8 shown in FIG. 4, where a relatively simple analog circuit compensates for the currents flowing from the electrodes 6 to their local shields 7 through the impedances Z3, Z4. A fifth buffer amplifier A5 with high-impedance input and reversed triple gain has its input connected to the first shield 7 and its output to the first electrode 6 through a fifth non-zero series impedance Z5. A sixth buffer amplifier A6 with high-impedance input and reversed triple gain has its input connected to the second shield 7 and its output to the second electrode 6 through a sixth non-zero series impedance Z6. The fifth series impedance Z5 is dimensioned to equal the impedance Z3 between the first electrode 6 and the first shield 7, and the sixth series impedance Z6 is dimensioned to equal the impedance Z4 between the second electrode 6 and the second shield 7. The added circuitry yields a significant increase in the sensitivity of the system 8 of FIG. 4. Alternatively, inductors could be used to create a parallel resonance with the impedances Z3, Z4 in order to increase the impedances and thereby reduce the fixed load on each of the electrodes 6, but this method is often disadvantageous due to price and size considerations. Inductors are relative expensive and large components, especially if they are required to resonate with small capacitances in the range of only a few pF at low frequencies of maybe only a few kHz.

The series impedances Z1, Z2 and most advantageously Z5 and Z6 may be either manually adjustable, e.g. by a trimmer capacitor, or electronically adjustable, e.g. by the use of capacitance (varactor) diodes, which may be adjusted by means of a voltage signal. In order to simplify adjustment of series impedances and/or amplifier gains, voltage signals on single or multiple electrodes 6 and/or shields may be temporarily switched off. Preferably, the electrodes 6 and/or shields 7 to be switched off are physically or electronically disconnected (by a high impedance) instead of grounding them, i.e. switching them to the ground potential. Disconnection eliminates currents flowing to or from the disconnected electrodes 6 and/or shields 7, so that impedances between the remaining electrodes 6 and/or shields 7, and other system impedances, may be determined more accurately. An automatic adjustment procedure may be implemented in, e.g. a microcontroller, in which case the use of the feedback amplifiers A5 and A6 in conjunction with e.g. electronically adjustable series impedances Z5 and Z6, such as capacitance diodes, enables the system 8 to adapt to actual installation conditions, including different cable impedances and different electrode/shield arrangements. Such an automatic adjustment procedure may of course also be used in connection with other embodiments of the invention, possibly implementing other methods for compensating for or cancelling known currents.

The ability to distinguish between objects 4 on e.g. a conveyor belt 3 and disturbing objects may be used to stop potentially dangerous machinery, such as the conveyor belt 3, or facilitate other protective actions when a person approaches the system 8. The detector system 8 may further be combined with an access control system, so that authorized persons (i.e. specially educated operators) will not cause the machinery to stop, whereas non-authorized persons will cause it to stop. Authorized persons may identify themselves to the access control system e.g. by entering a code on a keyboard, by carrying a capacitively or inductively coupling transmitter, which transmits a code in one of the numerous ways known to the person skilled in the art, or by carrying e.g. an RFID-tag. The access control system may be a separate system or form part of the detector system 8. The access control system may be implemented as a capacitively coupling system described later in this application. The access control system or the detector system 8 may implement several zones, each comprising one or more machines or machine parts, to which access is granted individually for persons entering or transmitting the required codes. Numerous ways of implementing safety zones are known to the person skilled in the art. The access control system or the detector system 8 may issue a visible or audible alarm when a person enters one of the secured zones. Even if the system does not stop a corresponding machine part, namely in case the system determines that the person is authorized, the system may nevertheless issue the alarm in order to alert the authorized person of the increased danger.

Figure 6:
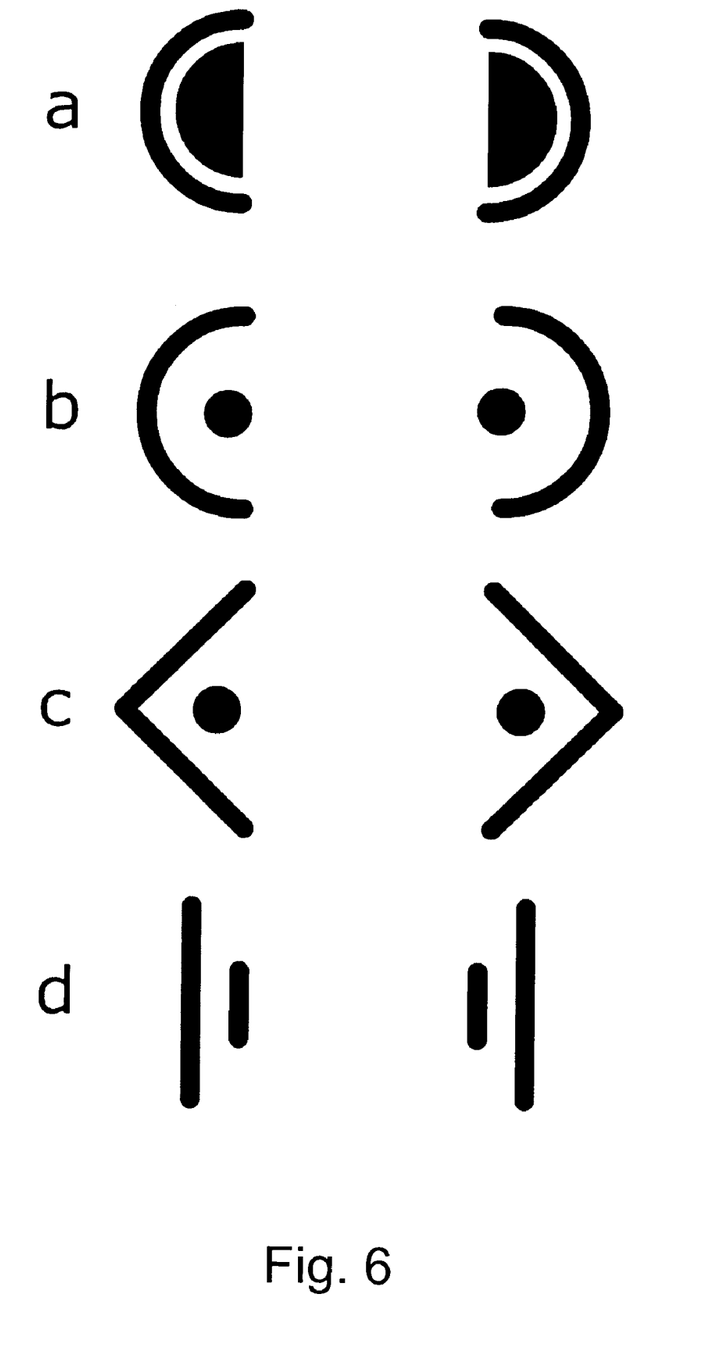
FIG. 6 shows four examples of orientations and cross sections of electrodes and shields, which may be used in a system according to the invention.

FIG. 6 shows four examples a, b, c, d of preferred cross sections and orientations of electrodes 6 and shields 7. The sensitivity of the system and the shape of the sense region 12 depend highly on the shape and orientation of the electrodes 6 and shields 7. One or more of the electrodes 6 may alternatively be plate-shaped and placed directly below, and co-planar to, the conveyor belt 3 or form a gate across the conveyor belt 3 or a similar conveying system. Other shapes and orientations may easily be contemplated by a person skilled in the art.

Figure 7:
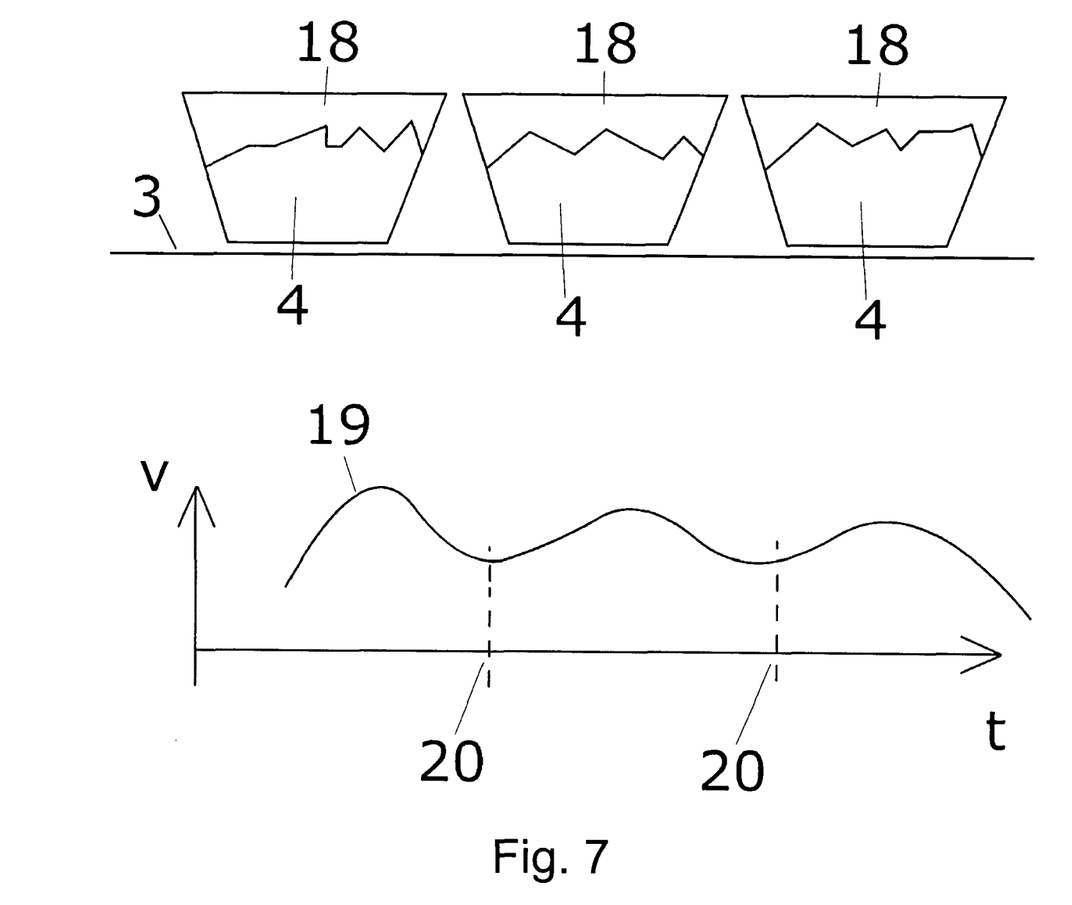
FIG. 7 shows a diagram of the temporal variation of a measured value in a system according to the invention.

In FIG. 7 a number of trays 18 are placed on a conveyor belt 3. Each tray 18 contains meat cuts 4. The trays 18 are very close to each other on the belt 3, wherefore a very precise position measurement is required in order to detect the individual trays 18 separately. The curve 19 shows the temporal variation of the capacitance $C_X$ as the trays 18 are moved by the conveyor belt 3, thereby passing the sense region 12 of a system 8 as shown in e.g. FIG. 1 position 11. The positions of the trays 18 may be determined precisely by processing voltage signals within the system 8, thereby determining the temporal minima 20 of $C_X$. Temporal processing may further comprise time-domain filtering, frequency analysis, integration, differentiation, computation of correlation coefficients and/or any other mathematical operations.

One advantage with the present invention is that no electrodes 6 or shields 7 need to be connected to the ground and/or circuit ground potential. Nor is there any need that the objects to be detected be connected to ground and/or circuit ground nor having any known impedance to ground and/or circuit ground potential.

The buffer amplifiers A1-A4 in the system are preferably DC-coupled so that static fields or other DC offsets are compensated for automatically.

The electrodes 6 and/or shields 7 may consist of a metal part placed on an electrical isolator made of e.g. rubber or plastic and may be coupled to the electronics through cables, preferably via water-tight connectors. Electrodes 6 and/or shields 7 may be formed as hollow metal housings, wherein electronic parts may be arranged and sealed or moulded with water-tight plastic compound, thereby protecting the electronics against moisture, chemicals and mechanical forces.

The electrodes 6 and/or shields 7 may be electrically isolated from the frame 2 or other metallic parts of the conveying system 1, which are typically connected to ground. In some cases, however, such parts may be used as electrodes 6 and/or shields 7. The system electronics may be placed in a water-tight box made of stainless steel or another material, which is able to withstand both mechanical forces and chemicals. The electronics in the box may be sealed or moulded with water-tight plastic compound as well.

In some cases it may be necessary or desirable to improve the system by connecting the circuit ground of the system 8 to actual ground. This can be done directly via cables to Earth or indirectly via a capacitor, or via an inductor and a capacitor connected in series—i.e. an LC-circuit, to one or more of the mains power supply wires. An advantage of using an LC-circuit is that the impedance is low only in a limited frequency range, wherefore both high-frequency noise and low frequency disturbances, such as the 50 Hz or 60 Hz mains frequency, may be filtered effectively, whereas signal frequencies of 1 kHz or above "see" a low impedance to ground. The ground connection may also be established via a grounded machine or machine part, preferably via an LC-circuit.

The description of the present invention has been based on fixed-frequency signal sources and on detecting amplitude and phase changes of signals in order to detect changes in capacitances in the sensor system, primarily $C_X$. It should nevertheless be clear to those skilled in the art that this method is only one of several methods to achieve the purpose of the presented sensor system. As an example hereof, methods for detecting the frequency of an oscillating circuit, where the frequency is affected by $C_X$ or other parameters in the sensor system, are therefore also covered by the present invention.

The above mentioned methods and systems 8 may be improved further by combining them with the method and/or system for determining the distance between two objects, which is disclosed in the European Patent EP 0 850 385. In this way a more reliable detection may be achieved of e.g. persons or fork lifts approaching potentially dangerous machinery. Persons or other moving objects likely to be operating in the vicinity of the detector system 8 may receive a special, possibly coded, signal capacitively from a transmitter placed away from, or on an outer face of, the machinery. When the object or person approaches the machine, the special signal will be transmitted capacitively from the transmitter to the object or person and further from the object or person to the electrodes 6 and/or shields 7 of the detector system 8, which may then detect the signal, compare its amplitude to a predetermined threshold, and stop the machine in case the amplitude of the special signal is above the threshold. Such a system may, of course, alternatively be implemented as a stand-alone system without any connection to the detector system 8, in which case it backs up the object-distinguishing capabilities of the method and/or system 8 according to the present invention. The machine itself—or part hereof—may be used a transmitter for the special signal, or a dedicated transmitter, such as a metallic tape or a wire, may be fitted to the machine, whereas metallic conductors on, or embedded in, the ground, e.g. metallic tape, plates or wires, may serve as receivers for the special signal, or vice versa. Several transmitters and/or receivers may be arranged in order to create e.g. different zones or different zone extensions in order to enable different reactions to approach from different angles or at different distances from the machine. If the machine itself is used as transmitter or receiver, it may be necessary to modify the machine's ground connection by inserting an inductor in series with the connection, thereby preventing shorting of the special signals to ground. Alternatively, other types of access control systems or proximity detection systems may be used to back up or enhance the detector system 8.

The methods for determining the distance between two objects, and the corresponding systems, which are disclosed in the European Patent EP 0 850 385 may be improved in a first improvement invention by differentiating the computed distance once or twice in order to determine the velocity and/or the acceleration of the objects towards each other, estimating when a dangerous situation may occur, and subsequently computing a safe distance for activating safety stops or the like from the computed velocity or acceleration, thereby taking into account the time needed to effectuate the predetermined activity. This is especially useful in hand-held power tools, such as chain saws, where jamming of the chain may cause the tool to kick back, thereby endangering the person holding the saw. Known saws are typically equipped with a mechanical kick-back protection in form of a shield arranged close to the foremost handle and connected to a switch. If the tool kicks back, the shield will hit the hand holding the foremost handle, thereby causing the switch to activate a brake or interrupt the power supply, thereby causing the tool to stop. However, this kind of kick-back protection does typically only work if the tool kicks back upwards and nearly vertically. If the kick back happens in other directions, such as sidewards or downwards, the shield may actually be moved away from the hand instead, so that the protection fails. By measuring the distance, velocity and acceleration of the two objects relative to each other, the improved system is able to detect a kick-back, which might endanger the operator of the power tool, regardless of the direction and subsequently shut off or brake the active portion of the tool at a safe distance from the operator's body.

The first improvement invention covers a method for sensing the distance between a first object and a second object being moved relative to each other and for activating or facilitating a predetermined action or predetermined actions when said distance has attained a value including zero, the method comprising the steps of: transmitting a proximity signal between a transmitting system and a receiving system, the first object and the second object each constituting an integral part of a respective one of the systems, and the proximity signal providing indication of the distance between the first object and the second object; monitoring the proximity signal for sensing variations of the signal as the first object and the second object are moved relative to each other; and activating the predetermined action when the signal has attained a predetermined condition, characterized in that it further comprises the step of determining the speed with which the first and the second objects are moved relative to each other, and that the decision whether to activate the predetermined action or not is based on the determined speed value.

The first improvement invention further covers a method as disclosed above, characterized in that it further comprises the step of determining the acceleration with which the first and the second objects are moved relative to each other, and that the decision whether to activate the predetermined action or not is based on the determined acceleration value.

The first improvement invention further covers a method as disclosed above, characterized in that it further comprises the step of estimating when a dangerous situation may occur based on the determined speed and/or acceleration values.

The first improvement invention further covers methods as disclosed above, characterized in that the first object and the second object each constitute a part of the signal path of the proximity signal.

The first improvement invention further covers methods as disclosed above, characterized in that the proximity signal is a capacitive proximity signal.

The first improvement invention further covers a system implementing the methods disclosed above.

The methods and systems disclosed in EP 0 850 385 may be further improved in a second improvement invention as described below in order to automatically prevent and/or compensate for varying capacitive coupling, bypassing or decoupling of signals between different objects and medias, including Earth.

In electrical power tools and other potentially dangerous machines using capacitive coupling as a detection method to detect violation of safety distances between e.g. a saw blade and a person or a saw blade and the electrical AC power cord, it is often necessary or desirable to suppress coupling through nearby objects and/or to compensate for changes in coupling through media that represent a low impedance to the system's circuit ground (signal reference point). An example is a hedge trimmer or a chain saw with a built-in safety sensor that monitors the distance between the cutting parts (blade/saw) and other objects, such as the operator or the power cord, and activates predetermined actions e.g. an alarm or an electrical or mechanical brake that stops the cutting parts (blade/saw), when a predefined threshold distance is violated, e.g. when the cutting parts are less than 30 cm away from an object to be protected e.g. any of the operator's body parts, such as leg, foot, head etc. In a tool with such a system, which monitors the distance using amplitude and/or phase and/or frequency measurements of the capacitively coupled signal, the signal is affected by nearby objects. There are mainly two types of coupling, which are especially disturbing: A) Coupling through objects that have a higher dielectrical constant than air, i.e. objects that represent an electrical impedance lower than that of air, and B) Decoupling of the sensor signals to nearby media that represents a low impedance to the sensors signal reference point, i.e. system ground.

The system's ability to reliable detect the true distance between the operator's body and the machine's cutting parts may be drastically improved by ensuring a low impedance at the signal frequency/signal frequencies between the system ground and objects surrounding the operator and the machine, e.g. trees, grass etc. This may be accomplished by connecting the system ground via a capacitor to the machine's 50 Hz/60 Hz power lines, as these power lines possess a relatively low impedance to Earth. This reduces the problems described in A) above by preventing the signals from coupling through objects with higher conductivity than air. However, the low impedance to Earth causes the operator to have varying capacitance between the operator's body and Earth, and therefore also between the operator's body and the system ground, when the operator moves during working with the electrical garden or power tool, such as the hedge trimmer or chain saw mentioned above. Since the system outputs an electrical AC signal to the blade/saw and monitors the signal level coupling through air and through the operator's body and back into the system through a capacitive coupling via one of the power tool handles, the system performance, i.e. its ability to reliably detect proximity between the tool and the operator, will degrade due to varying signal decoupling from the operator's body to Earth. The degradation will depend on what objects or materials the operator is close to, and what he is standing on (grass, tiles, a ladder etc.). Also other parameters, such as type of the operator's shoes will have an influence, e.g. the system performance will depend on the operator wearing thick shoes that are poor electrical conductors, or him being barefoot etc. Unwanted coupling may also take place via metal parts of stationary machinery.

The following auto-compensation method overcomes the problems described above by providing at least two signal paths, thereby using one of the paths to control the transmitter and/or the receiver, so that coupling from one of the objects, between which the distance is to be measured, to Earth is compensated for. By adjusting the transmitted signal level so that the signal level on the operator's body is constant, regardless of the signal coupling to Earth, or adjusting the receiver's sensitivity, i.e. detection threshold, correspondingly, or implementing a combination of the two, the signal "lost" to Earth will not disturb the system anymore.

Figure 8:
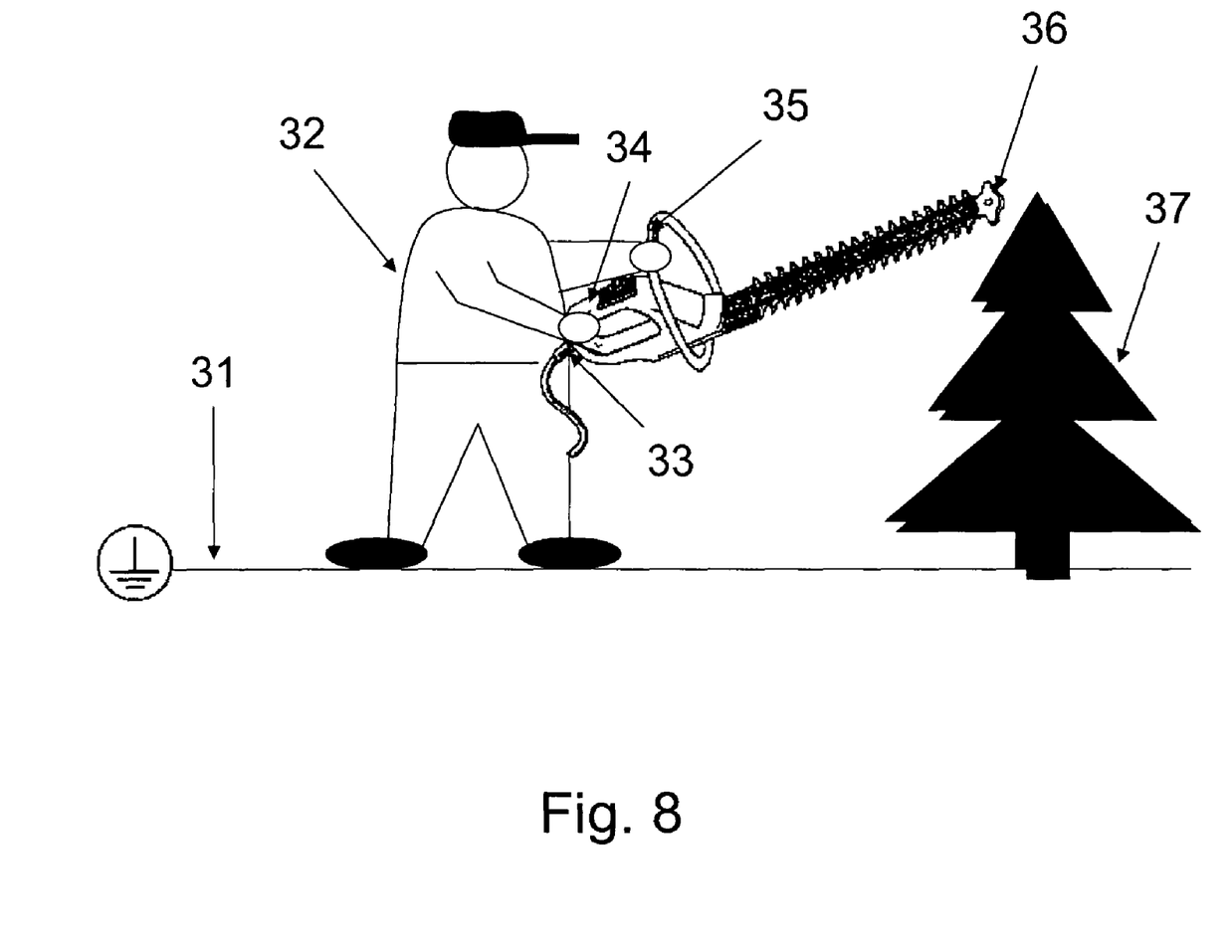
FIG. 8 shows an embodiment of a method for distance measurement.

FIG. 8 shows an embodiment of a system implementing the improved methods and systems mentioned above according to the second improvement invention. A first AC voltage signal is applied to the blade/saw 36, and a second AC voltage signal is applied to the front handle 35 of a two-handle hedge trimmer. A first sensor 34 monitors signal levels received at the rear handle, the signal being capacitively coupled from the operator's 32 hand holding the rear handle. A second sensor 33 monitors signals received from an extra wire built into the AC power cord. The signal generators and the sensors are grounded via a capacitor and one or both power supply leads of the hedge trimmer's power cord. The first and second voltage signals may be operated in a time-divided manner, i.e. active at different times, or in a frequency-divided manner, i.e. operating at different frequencies, but at the same time, or a combination of both in order to facilitate the distinction between the signals at the sensor side. The first signal from the blade 36 couples capacitively to the operator's 32 body, conductively via his skin, and capacitively to the first sensor 34 at the rear handle. The first sensor 34 at the rear handle is dimensioned so that the capacitance between the first sensor 34 and the operator's 32 hand is very much larger than the capacitance through the air between the blade 36 and the operator 32. Therefore, the level of reception of the first signal at the first sensor 34 depends substantially on the distance between the blade 36 and the operator's 32 body, but will also vary due to decoupling of the operator's 32 body to Earth 31, i.e. to the transmitters' and sensors' signal reference (circuit ground). The second signal coupled from the front handle 35 via the operator's 32 body to the first sensor 34 will also vary, depending on the signal decoupling to ground 31 of the operator's 32 body, but it is independent of the distance between the blade 36 and the operator's 32 body. It is therefore possible to monitor the capacitive signal decoupling of the operator's 32 body and use this information to perform an auto-compensation, i.e. a signal processing (by hardware and/or software) to correct the transmitting level or the signal levels detected at the first sensor 34 from the blade 36 in order to obtain a true representation of the distance between the operator's 32 body and the hedge trimmer blade 36, independent of the person's 32 capacitive coupling and/or decoupling to ground 31, i.e. independent of whether the person 32 is standing on dry grass, wet grass, tiles, a ladder etc. Similarly, the level of reception of the first signal received at the second sensor 33, indicates the distance between the blade 36 and the power cord. Although the first signal from the hedge trimmer blade 36 coupling capacitively to the extra wire in the power cord does not go through the operator's 32 body, the information obtained from monitoring the signal variations (due to variations in decoupling) from the second transmitter 35 to the first sensor 34 at the rear handle can also be used to process the signal received by the second sensor 33 via the extra wire in the power cord, thereby maintaining a stable safety distance between the hedge trimmer blade 36 and the AC power cord.

The method and/or system may be implemented "the other way around", i.e. with a single transmitter in one of the handles, a first sensor in the blade 36 and a second sensor in the other handle. The reception level at the second sensor will indicate the voltage signal level on the operator's 32 body, thereby enabling the system to adjust the transmitting level and/or the detection threshold as described above.

The second improvement invention covers a method for sensing the distance between a first object and a second object being moved relative to each other and for activating or facilitating a predetermined action or predetermined actions when said distance has attained a value including zero, the method comprising the steps of: transmitting a proximity signal between a transmitting system and a receiving system, the first object and the second object each constituting an integral part of a respective one of the systems, and the proximity signal providing indication of the distance between the first object and the second object; monitoring the proximity signal for sensing variations of the signal as the first object and the second object are moved relative to each other; and activating the predetermined action when the signal has attained a predetermined condition, characterized in that it further comprises the steps of: providing a reference transmitter transmitting a reference signal, which differs from the proximity signal, and/or a reference receiver, the reference transmitter coupling capacitively through a first reference capacitance to the one of the objects, which constitute an integral part of the receiver, and/or the reference receiver coupling capacitively through a second reference capacitance to the one of the objects, which constitute an integral part of the transmitter, the first and second reference capacitances being substantially larger than the capacitance between the first and the second object; measuring a first reception level of the reference signal at the receiving system and/or measuring a second reception level of the proximity signal at the reference receiver; adjusting the level of transmission from the transmitting system and/or the predetermined condition based on the first and/or second reception levels.

The second improvement invention further covers a method as disclosed above, characterised in that the first object and the second object each constitute a part of the signal path of the proximity signal.

The second improvement invention further covers a method as disclosed above, characterised in that the proximity signal is a capacitive proximity signal.

The second improvement invention further covers a system implementing the methods disclosed above.

Known hand-held power tools, like e.g. a hedge trimmer, typically have a mechanically operated two-handle grip system that requires both handles to be mechanically activated in order for the hedge trimmer to start. A system like the one described above enables an electronic version of a two-handle safety system to be implemented, since the second signal transmitted by the second transmitter 35 in the front handle and received by the first sensor 34 in the rear handle will be interrupted or diminish substantially if the operator 32 drops just one of the handles. By detecting the disappearance of the received signal, or the drop in its signal level, and subsequently power off the tool and/or activate a brake on the tools active portion, a cost-saving and reliable safety mechanism can be obtained, since only one mechanical switch is required in the rear handle and a lot of further mechanical parts can be omitted. Furthermore, the system cannot be bypassed by e.g. fixing the front handle with tape (in order to bypass the safety function and operate the machine with one hand only) as it is often seen by operators 32 using systems with a mechanical implementation of a two-handle safety system. The method described can of course be used on different machinery, including stationary machines.

A third invention correspondingly covers a method for preventing accidental start of a machine with two handles spaced apart from each other, the method comprising the steps of: providing a transmitter at one of the handles and a receiver at the other handle, the transmitter transmitting an AC voltage signal, and the receiver being able to detect the transmitted AC voltage signal; monitoring the reception level of the AC voltage signal; characterized in that it further comprises the step of: enabling the machine if the reception level exceeds a predetermined threshold.

The third invention further covers a method as disclosed above, characterized in that it further comprises the step of: disabling the machine if the reception level drops below a predetermined threshold.

The third invention further covers a method as disclosed above, characterized in that the AC voltage signal is coupled capacitively from the transmitter to one of the operator's hands, conductively via his body or skin and capacitively from his other hand to the receiver.

The third improvement invention further covers a system implementing the methods disclosed above.

The methods and systems disclosed in EP 0 850 385 may be further improved in a fourth improvement invention by monitoring the received signal for phase changes. Surprisingly, it has been found that objects connected to ground, such as trees, bushes and stationary machines provoke a phase shift of the received signals when the tool's active portion approaches such objects, whereas a person holding the tool and thereby receiving a signal via the handle of the tool does not provoke a phase shift when the tool's active portion approaches the person. If the protective action, such as stopping the tool, is only effected if the received signal does not exhibit a phase shift, the number of false alarms may be reduced substantially, whereby the usability of the tool increases.

The fourth improvement invention covers a method for sensing the distance between a first object and a second object being moved relative to each other and for activating or facilitating a predetermined action or predetermined actions when said distance has attained a value including zero, the method comprising the steps of: transmitting a proximity signal between a transmitting system and a receiving system, the first object and the second object each constituting an integral part of a respective one of the systems, and the proximity signal providing indication of the distance between the first object and the second object; monitoring the proximity signal for sensing variations of the signal as the first object and the second object are moved relative to each other; and activating the predetermined action when the signal has attained a predetermined condition, characterised in that the method further comprises the step of measuring the phase difference between the proximity signal transmitted by the transmitting system and the signal received by the receiving system, and that the decision whether to activate the predetermined action or not is based on the measured phase difference.

The fourth improvement invention further covers a method as disclosed above, characterized in that the first object and the second object each constitute a part of the signal path of the proximity signal.

The fourth improvement invention further covers a method as disclosed above, characterized in that the proximity signal is a capacitive proximity signal.

The fourth improvement invention further covers a system implementing the methods disclosed above.

Stationary machinery for processing hand-held items, such as table saws, fish processing machines and punching machines, present a particular problem for the methods and systems disclosed in EP 0 850 385, because the items should be allowed to approach the machine, whereas the person holding the items should not. For such machines, the methods or systems may be improved by arranging a plurality of transmitters and/or receivers, so that the person is part of the signal path of one capacitively coupling circuit, whereas the object is part of the signal path of another capacitively coupling circuit. The person may stand on a metallic plate, label or wire on the ground, which couples capacitively to his body, and the object may be subjected to a capacitively coupled signal through a machine part placed some distance away from the person. Both signals may be capacitively coupled to a single receiver, which, however, will be able to distinguish the signals if they differ in e.g. frequency.

Figure 9:
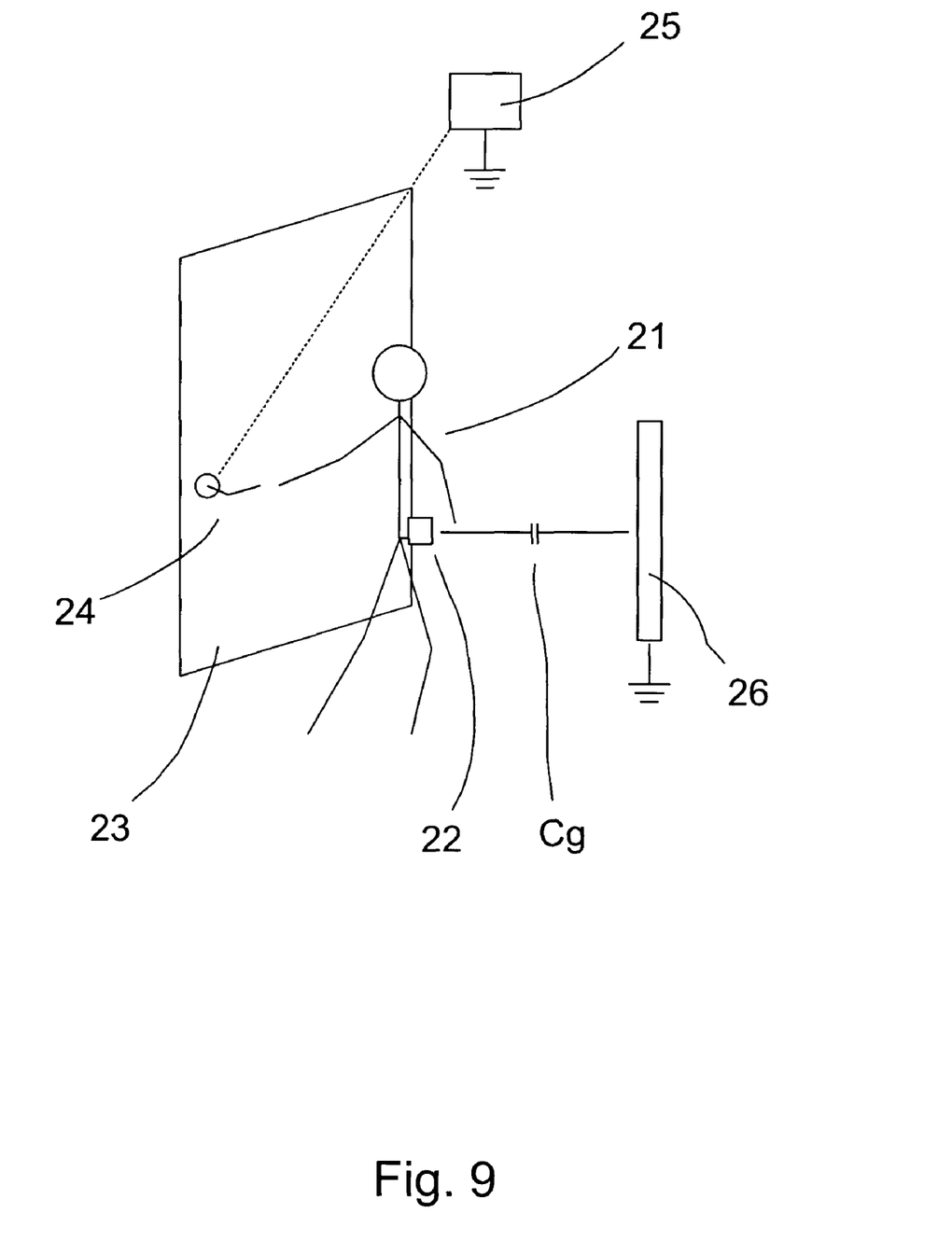
FIG. 9 shows a schematic of a system for access control.

In FIG. 9 part of an access control system is shown. A person 21 carries a signal generator 22, e.g. in a belt or a pocket. The signal generator 22 couples its output signal, which is a coded signal, capacitively to the persons 21 body. The coded signal travels through the body or along the skin to anything the person 21 touches. A door 23 is equipped with an entirely or partly conductive handle 24, which is connected to a control unit 25. When the person 21 touches the door handle 24, the control unit 25 receives the coded signal and unlocks the door 23 if the code matches an entry in a list of allowed personnel codes. This kind of access control systems, where the return path for the coded signal goes from the control unit 25 through the ground or the air to the person 21, is known from prior art. The system may be improved by providing an improved signal return path. This is accomplished by connecting the circuit ground on the signal generator 22 to a large capacitor plate, which is arranged on the outside of the signal generator 22, i.e. the side which is opposite the persons 21 body. A capacitor plate of credit-card size is sufficient to improve the return path enough to reduce the number of decoding errors made by the access control system. The return path may be further improved, and hence the error-rate of the access control system further reduced, by providing e.g. metallic posts 26, or other conductive items, connected to ground, and/or circuit ground, and placed in a space close to where the signal generator 22 carried by a person 21 will likely be positioned, when the person 21 touches the handle 24. The capacitive coupling between the signal generator 22 and the metallic post 26 is represented by the capacitance $C_g$. The invention also covers the reversed situation, where the signal is coupled capacitively from the signal generator 22 through the air, through a metallic post 26 or the like and further to the control unit 25, and the return path is formed by the body when the person 21 touches the handle 24. The control unit 25 or other parts of the access control systems may comprise circuits for detecting and/or identifying objects through inductive coupling or through radio frequency signals, such as RFID-tag detectors. Due to their larger detection ranges, such detectors may be used to wake up the capacitive electronic circuits of the access control systems in order to save power or to alert approaching persons in advance of their entry into an access controlled zone.

While the present invention has been illustrated and described with respect to a particular embodiment thereof, it should be appreciated by those of ordinary skill in the art that various modifications to this invention may be made without departing from the spirit and scope of the present.

What is claimed is:

1. A method for detecting the presence, and/or determining the location, and/or detecting changes in the material properties, of a first object within a predefined space and compensating for the disturbance caused by a second object, where the method comprises the following steps: providing at least a first and a second electrode capacitively coupled to each other; conductively applying an electrical signal to each of the first and second electrodes, the electrical signals being different for the first and second electrodes; for each of the electrodes measuring the current signal through, and/or the voltage signal on, the electrode; deriving from the measured values an indication of the disturbance caused by the second object; and deriving from the measured values and the indication of the disturbance a disturbance-compensated indication of the presence, and/or the location, and/or changes in the material properties, of the first object.

2. The method according to claim 1, further comprising the steps of: processing the measured values, and/or the disturbance-compensated indication of the presence, and/or the location, of the first object, in the time domain; and deriving from the processed data an improved indication of the location of the first object.

3. The method according to claim 1, further comprising the step of controlling the signals applied to each of the first and second electrodes so that the signals differ in phase, and/or frequency, and or in the time domain.

4. A system for detecting the presence, and/or determining the location, and/or detecting changes in the material properties, of a first object within a predefined space and compensating for the disturbance caused by a second object, the system comprising at least a first and a second electrode capacitively coupled to each other, at least one signal generating circuit conductively coupled to each of the first and second electrodes, at least one current and/or voltage sensing circuit coupled to each of the electrodes, and a detector circuit connected to the sensing circuits, the system further implementing the methods according to claim 1.

5. The system according to claim 4, wherein the first electrode and/or second electrode are shielded on their outsides, i.e. the sides opposite the predefined space, by one or more electrically conductive shields.

6. The system according to claim 5, wherein one or more of the shields are connected to ground and/or circuit ground.

7. The system according to claim 5, wherein at least one of the shields are connected to a signal source outputting a signal equal to the signal on the electrode shielded by this shield.

8. The system according to claim 5, wherein one or more of the shields are connected to a signal source outputting a signal equal to the signal on an electrode not being the electrode shielded by the shield.

9. The system according to claim 5, further comprising at least one buffer amplifier ($A_1, A_2$) with high input impedance, the input of the buffer amplifier ($A_1, A_2$) being connected to one of the electrodes and its output being connected to at least one of the shields.

10. The system according to claim 4, wherein the at least one signal generating circuit comprises a signal generator with a first and a second output, the first output being connected through a first non-zero series impedance ($Z_1$) to the first electrode and the second output being connected through a second non-zero series impedance ($Z_2$) to the second electrode, the signals output by the first and second outputs having reversed polarity with respect to each other.

11. The system according to claim 10, comprising at least a first and a second amplifier ($A_3, A_4$) with high input impedance and unity gain, a first electrically conductive shield arranged on the outside of the first electrode and a second electrically conductive shield arranged on the outside of the second electrode, the input of the first amplifier ($A_3$) being connected to the first electrode and its output being connected to the second shield, the input of the second amplifier ($A_4$) being connected to the second electrode and its output being connected to the first shield.

12. The system according to claim 11, comprising at least a third and a fourth amplifier ($A_5, A_6$) with high input impedance, the input of the third amplifier ($A_5$) being connected to the first shield and its output being connected through a third non-zero series impedance ($Z_5$) to the second electrode and the input of the fourth amplifier ($A_6$) being connected to the second shield and its output being connected through a fourth non-zero series impedance ($Z_6$) to the first electrode, the sizes of the series impedances ($Z_5, Z_6$) and the gains of the third and fourth amplifiers ($A_5, A_6$) being selected so that the currents flowing between the first electrode and the first shield as well as between the second electrode and the second shield due to capacitive coupling are substantially supplied—and thus compensated for—by the third and fourth amplifier ($A_5, A_6$) respectively.

13. A method for measuring impedances in a system claim 4, the method comprising the steps of: disconnecting at least one electrode and/or shield from ground and/or circuit ground and/or its corresponding signal sources; applying a voltage signal to at least one other electrode and/or shield; measuring the current through, and/or the voltage on, at least one electrode and/or shield.

14. The method according claim 13, further comprising the step of: adjusting applied signals, amplifier ($A_5, A_6$) gains and/or non-zero series impedances ($Z_5, Z_6$) in the system on the basis of the measured impedance values.

15. Method for adjusting a system according to claim 4, the method comprising the steps of: providing a voltage sensing probe; moving the probe within the predefined space; identifying positions with minimum signal level; adjusting applied signals, amplifier ($A_5, A_6$) gains and/or non-zero series impedances ($Z_5, Z_6$) in the system on the basis of the identified positions.

* * * * *